United States Patent
Jones

(10) Patent No.: US 6,612,407 B2
(45) Date of Patent: *Sep. 2, 2003

(54) DRUM BRAKES

(76) Inventor: John Bryn Jones, Rose Cottage, Church Lane, Chesterton, Leamington Spa, Warwickshire, CV33 9LG (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/367,171
(22) PCT Filed: Dec. 11, 1998
(86) PCT No.: PCT/GB98/03717
§ 371 (c)(1), (2), (4) Date: Aug. 9, 1999
(87) PCT Pub. No.: WO99/31401
PCT Pub. Date: Jun. 24, 1999

(65) Prior Publication Data
US 2002/0179378 A1 Dec. 5, 2002

(30) Foreign Application Priority Data
Dec. 16, 1997 (GB) .............................. 9726440

(51) Int. Cl.$^7$ .............................................. F16D 51/00
(52) U.S. Cl. ...................... 188/74; 188/106 A; 188/325
(58) Field of Search ...................... 188/74, 2 D, 106 A, 188/325, 326, 106 F, 78, 328

(56) References Cited

U.S. PATENT DOCUMENTS

| | | | | |
|---|---|---|---|---|
| 4,930,605 A | * | 6/1990 | Boyer et al. | 188/2 D |
| 4,932,503 A | * | 6/1990 | Yamamoto | 188/2 D |
| 5,002,159 A | * | 3/1991 | Brix et al. | 188/2 D |
| 5,092,428 A | * | 3/1992 | Kobayashi et al. | 188/106 A |
| 5,377,789 A | * | 1/1995 | Brooks, Sr. et al. | 188/2 D |
| 5,671,639 A | * | 9/1997 | Wagner et al. | 188/2 D |

FOREIGN PATENT DOCUMENTS

| | | | |
|---|---|---|---|
| DE | 0484590 | * | 12/1990 |
| GB | 0315313 | * | 5/1989 |

* cited by examiner

*Primary Examiner*—Pam Rodriguez
(74) *Attorney, Agent, or Firm*—Paul E Milliken; Ray L Weber

(57) ABSTRACT

A method of attaching a brake cable assembly onto a drum brake assembly is disclosed for a new form of brake cable having a cable inner portion with an end fitting and a cable outer portion comprising a cable sheath and a guide. The cable guide is inserted through a hole in a backplate of the brake assembly and positioned such that an open end of the guide is presented adjacent an automatic latching device on a parking brake lever of the brake assembly. The cable inner is then advanced through the cable outer such that the end fitting is guided towards, and engages the automatic latching device. The cable outer and backplate may be provided with corresponding orientation features which are aligned to ensure the correct presentation of the open end of the guide adjacent the latching device during assembly. These orientation features may take the form of interengaging formations on the backplate and cable outer. The guide may include a spring which acts as a return spring for the parking brake lever.

14 Claims, 6 Drawing Sheets

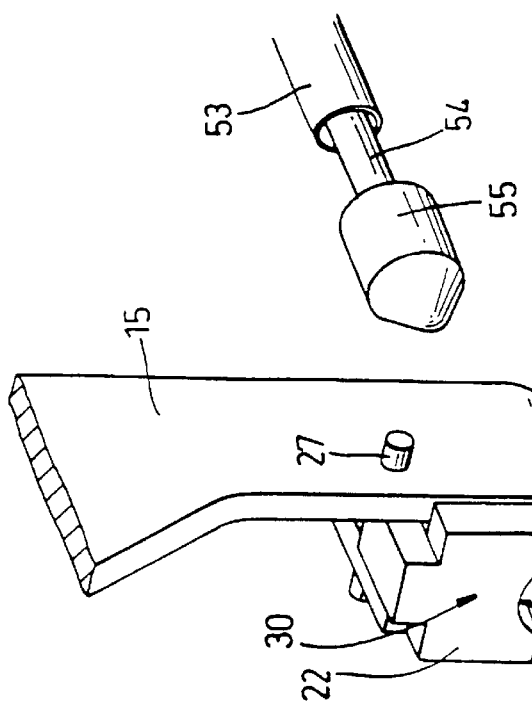
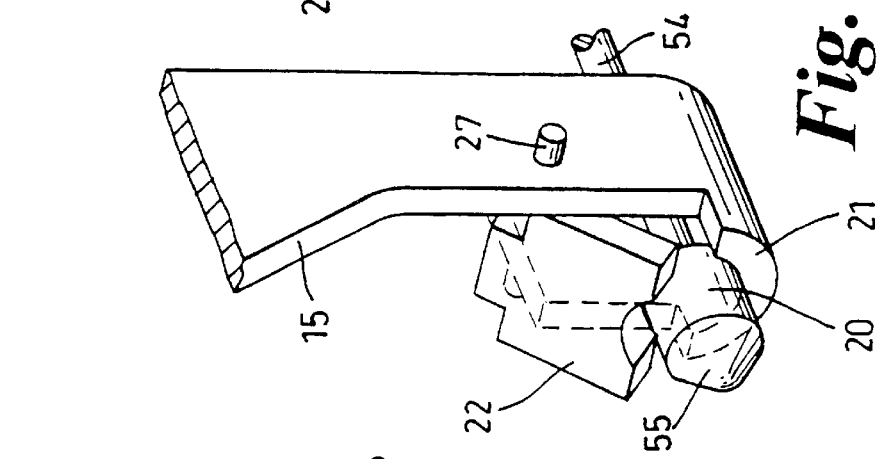
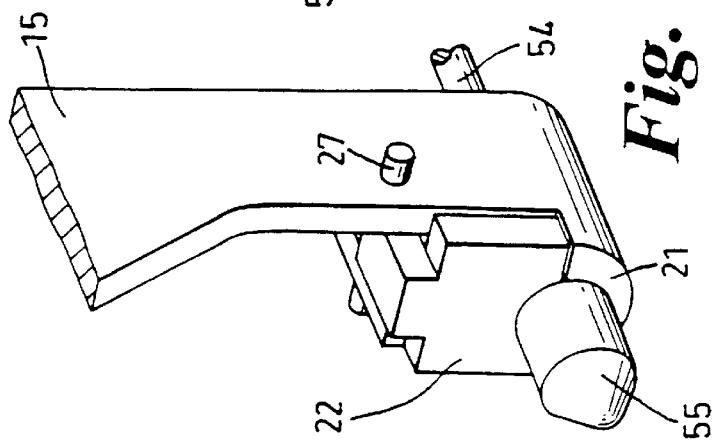
Fig. 3A
Fig. 3B
Fig. 3C

DRUM BRAKES

This invention relates to brake cables, drum brake backplate, drum brake assemblies, and methods of assembling brake cables onto drum brake assemblies. In particular the invention relates to guides for guiding a brake cable inner portion towards an automatic latching device on a brake shoe lever in a blind manner i.e. when the brake cable inner portion and the automatic latching device is obscured from view and/or inaccessible to any assembly tools.

It is an object of the present invention to provide improved brake cables, drum brake backplate and drum brake assemblies and also to provide an improved method of assembling a brake cable onto a drum brake assembly.

This in accordance with the present invention there is provided a method of assembling a brake cable assembly onto a drum brake assembly, the brake cable assembly comprising a cable inner with an end fitting and a cable outer comprising a cable sheath and a guide, the drum brake assembly comprising at least a back plate and a lever for operation of a brake shoe to provide a parking function, the lever having an automatic latching device, the method comprising the steps of a) inserting the guide with the cable inner portion therein through a hole in the backplate b) positioning the cable assembly such that an open end of the guide is presented adjacent the automatic latching device c) advancing the cable inner through the cable outer such that the end fitting is guided towards, and engages the automatic latching device.

Furthermore in accordance with the present invention there is also provided a drum brake backplate including a brake cable hole and an adjacent orientation feature to ensure correct alignment of a brake cable during fitting of the brake cable.

The present invention will now be described, by way of example, with reference to the accompanying drawings in which;

FIGS. 3A, 3B and 3C are perspective views showing three stages in the latching sequence of the latching device of FIG. 2;

Figure 1:
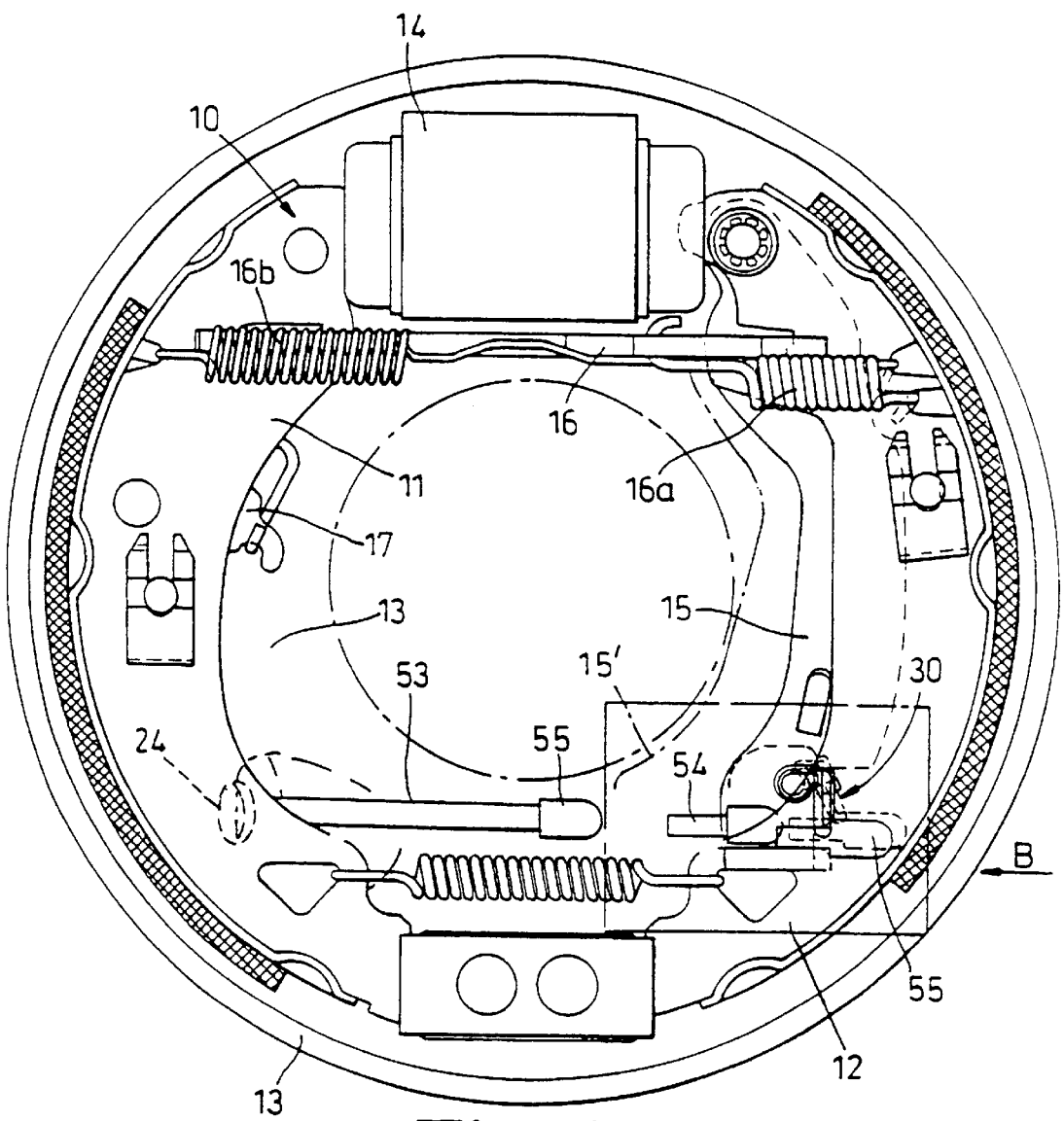
FIG. 1 is a side view of a drum brake assembly which includes a brake cable assembly according to the present invention and also includes a drum brake backplate according to the present invention.
Figure 2:
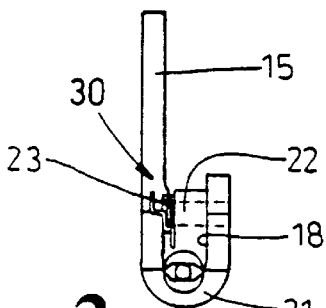
FIG. 2 is a view in the direction of arrow B of FIG. 1 of details of an automatic latching device.
Figure 4:
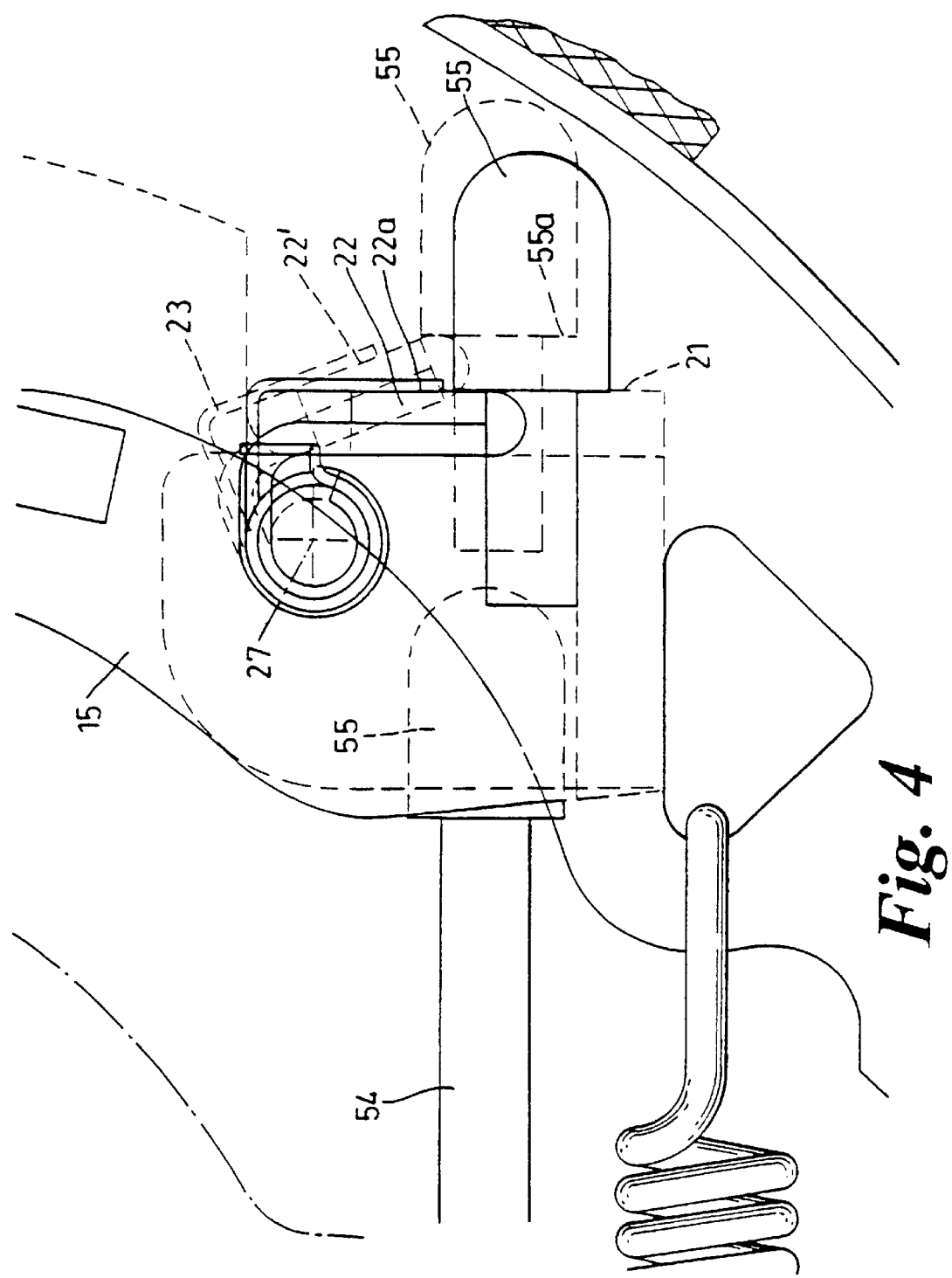
FIG. 4 shows the details of the latching device of FIG. 1 on a larger scale.

Referring to FIGS. 1 to 4 these show a drum brake assembly 10 in which two brake shoes 11 and 12 are mounted on a backplate 13 for service application by an hydraulic cylinder 14 in the known manner. A parking brake function is provided in which pivoting of a parking lever 15 from the full line position shown in FIG. 1 to the dotted position 15' applies both shoes to the brake drum via a strut 16. Strut 16, which is held against shoe 12 at all times by spring 16a, extends between the brake shoes and, in addition to operating the drum brake, also limits the retracting of the shoes under the action of pull-off spring 16b. The effective length of strut 16 is adjusted by the service brake adjusting mechanism part of which is visible at 17 and which is more fully described in the Applicant's UK patent number 2272261.

At the lower end of parking brake lever 15 is an automatic latching device 30. The automatic latching device 30 is formed by a U-shaped portion of lever 15 bent to form a channel 18 (see FIG. 2) and a flap 22 which is pivotally mounted on the lever 15 and is biased by coil spring 23 into the full line position shown in detail in FIG. 4. A brake cable assembly 50 (see FIG. 5) comprised a cable outer 51 and a cable inner portion 54. Cable outer portion 51 comprised a cable sheath 52 and a guide 53, the cable sheath and guide can be a loose fit or preferably they can be fixed together e.g. by a swaging operation of the guide onto the cable sheath. The end of the guide remote from the cable sheath is known as the open end.

At one end of the cable inner portion 54 there is a drum brake parking lever end fitting 55 for connection with a drum brake parking lever. The cable inner portion is closely surrounded by the cable sheath 52 in a manner well known in the art. Cable sheath 52 can be of a "Bowden cable" flexible construction.

Figure 5:
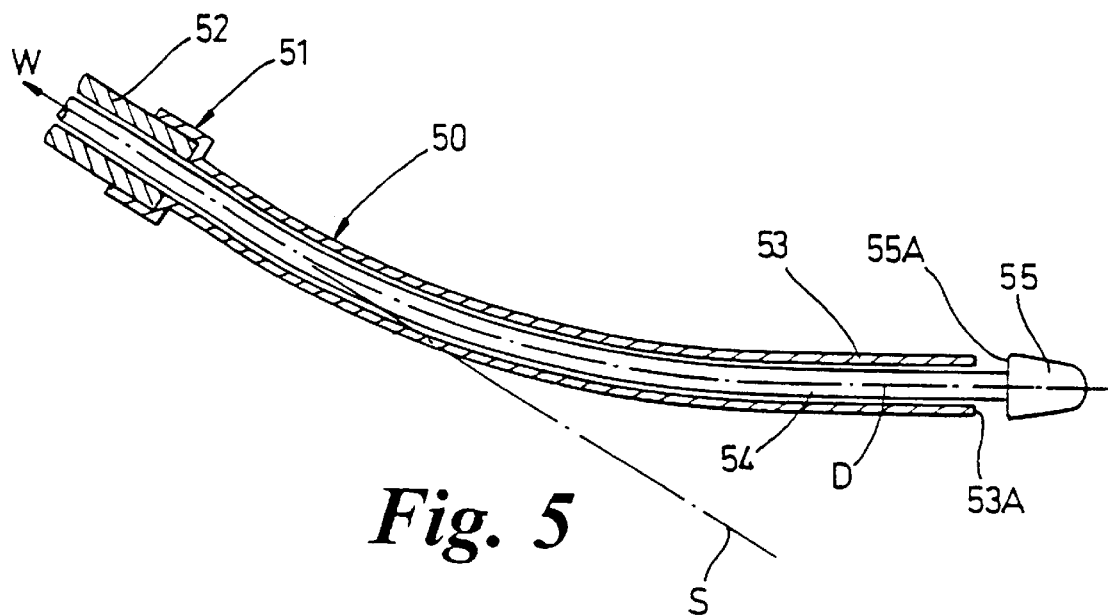
FIG. 5 shows part of a brake cable assembly according to the present invention.

The cable inner portion 54 would naturally lie along a straight line S but for the straight line position S to a deflected position indicated by line D in FIG. 5.

It will be further noted that in this embodiment withdrawal of the cable inner portion 54 in the direction W relative to the cable outer portion 52 is limited by an abutment surface 55a on end fitting 55 contacting an abutment surface 53a on the open end of guide 53. In further embodiments this need not be the case and the end fitting could pass down all or part of the guide 53.

Figure 6:
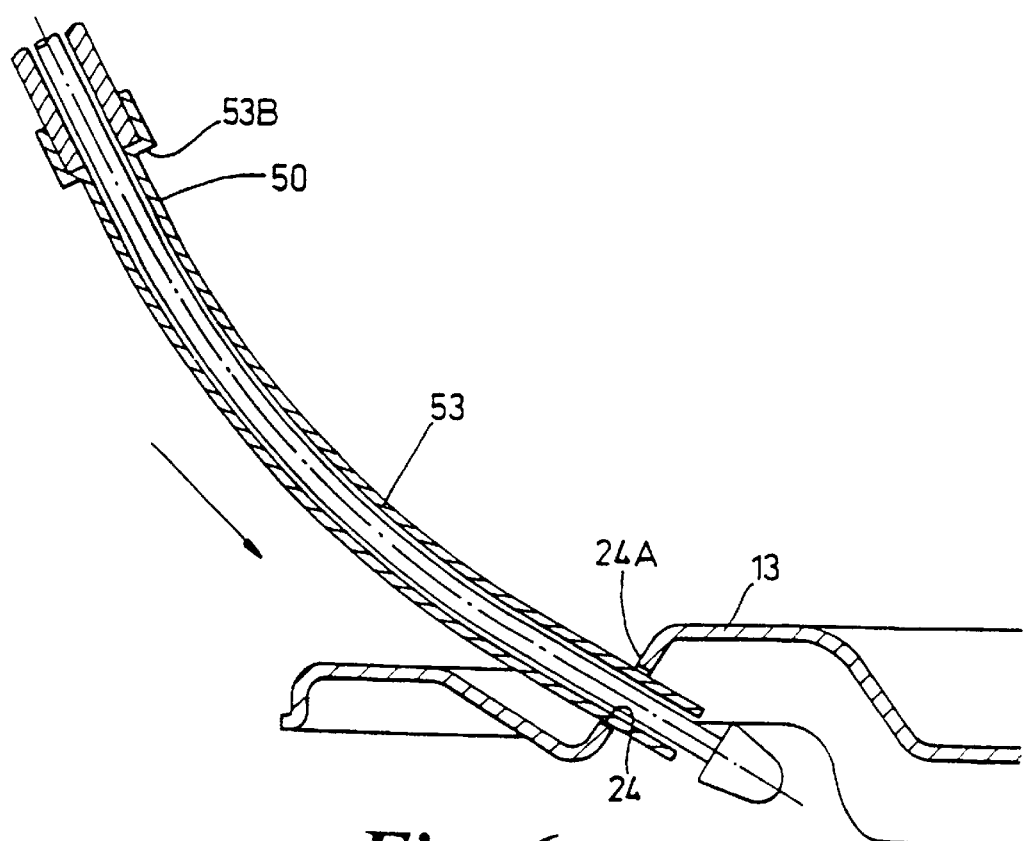
FIGS. 6 to 8 show operations in a method of assembly of the brake cable assembly of FIG. 5 onto a drum brake assembly (with several of the components of the drum brake not shown for clarity)

The method of attaching the brake cable assembly (50) on to the drum brake assembly is as follows:

The guide 53 along with end fitting 55 and the portion of able inner portion 54 within the guide 53 is inserted through hole 24 in backplate 13 (see FIG. 6). The components of the drum brake assembly and the shape of the guide 53 allow the guide to be fully inserted into the hole 24 such that abutment 53B on guide 53 contacts abutment 24A on the edge of hole 24 (see FIG. 7). The design of the components of the drum brake assembly is such as to allow insertion of the guide 53 without fouling any of the drum brake assembly components. Once inserted into the backplate it may be necessary to correctly orientate the guide relative to the backplate e.g. by slightly rotating the cable outer about its longitudinal axis. This can be facilitated by marks (now shown) on the visible portion of the guide of cable sheath being aligned with marks (now shown) on the visible outer portion of the backplate. Once such orientation features have been aligned the open end of the guide will be represented in the correct position adjacent the automatic latching device. The cable inner can then be advanced in the direction of arrow A of FIG. 7 relative to the cable outer and guide so that the end fitting is guided towards and engages the automatic latching device 30 (see FIGS. 3A, 3B, 3C and 8).

The automatic latching of the end fitting 55 to the automatic latching device is best seen from FIGS. 1 and 3A to 3C. The cable inner 54 with its end fitting 55 is fed into the end of channel 18 in lever 15. The end fitting then contacts the latching flap 22 and displaces the flap anti-clockwise about its pivot 27 as shown in dotted detail 22' in FIGS. 1 and 4. After the end fitting 55 has fully passed the flap 22 the flap 22 snaps back behind abutment 55A on end fitting 55 to latch the cable between the lower edge of flap 22 and the edge 21 of lever 15 as shown in FIG. 3C. This automatic latching device is the subject of the Applicant's co-pending published PCT Application No. WO98/40640.

It is not necessary to use the automatic latching device as shown in the FIGS. 1 to 4 and 8 and any alternative automatic latching devices could be used such as those shown in European patents EP 0397850 or EP 0311346 or EP 0315313.

In further embodiments, alignment of orientation features may not be necessary, for example components within the parking brake assembly may be designed to restrict the ultimate position of the guide such that its open end is automatically presented in the correct position.

Figure 9:
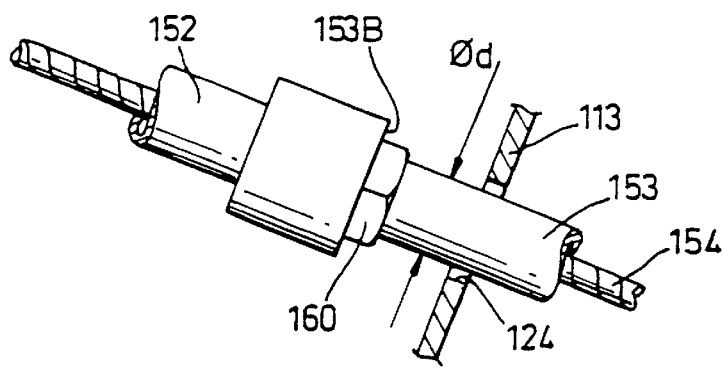
FIG. 9 shows a partial view of a second embodiment of a brake cable assembly according to the present invention being assembled through a hole of a drum brake backplate according to the present invention.

FIG. 9 shows a second embodiment of a guide 153 with associated cable sheath 152, cable inner portion 154 and backplate 113. In this case there is a shaped orientation feature on the cable outer portion in the form of a short hexagonal portion 160 which engages with a correspondingly shaped orientation feature on the drum brake assembly in the form of a hexagonal hole 124 in the backplate such that rotation of the guide relative to the drum brake assembly cannot occur thus ensuring the correct presentation of the open end of the guide is maintained.

It should also be noted that the hole 124 is significantly bigger than the general cross section of the guide (which since in this case the guide is in the form of a tube, the general cross section is a circle of diameter d). This is because there is a step between the abutment 153B and the hexagonal portion 160 and a further step between the hexagonal portion 160 and the diameter d. This has the advantage of allowing more manoeuvrability of the guide during insertion to avoid fouling of components of the drum brake assembly whilst still fully closing off the hole 124 to prevent ingress of dirt into the drum brake assembly.

Although in theory an orientation feature of a hexagon allows for six different orientations, in practice it is found that generally only one orientation is possible due to the close proximity of the drum brake assembly components to the guide when installed.

However if required further embodiments may have shaped orientation features that allow only one unique orientation such as a pip on the guide engaging a slot in the drum brake backplate.

A shaped orientation feature on the guide is preferably formed during a swaging operation of the guide onto the cable sheath.

Figure 7:
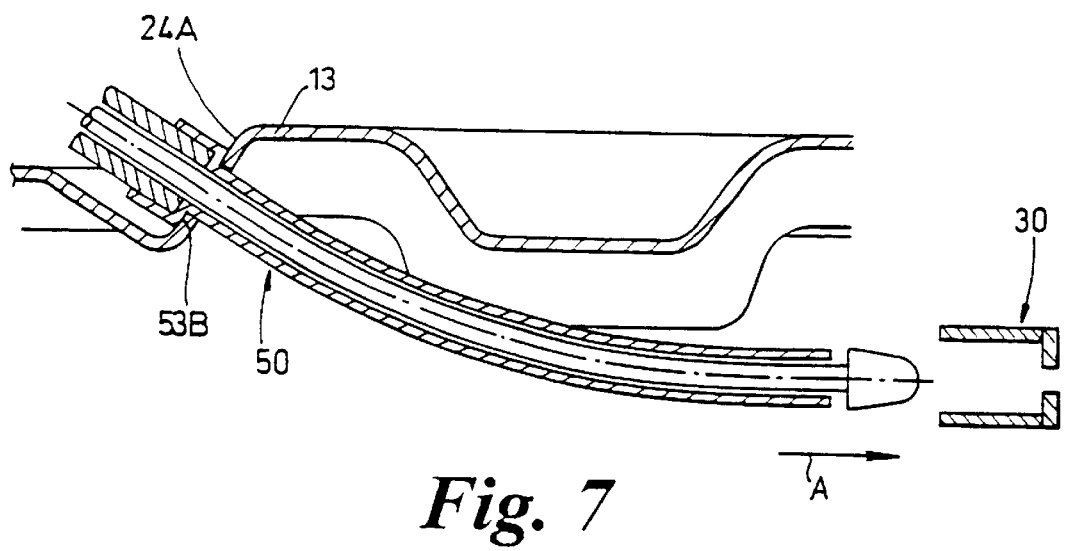
Figure 8:
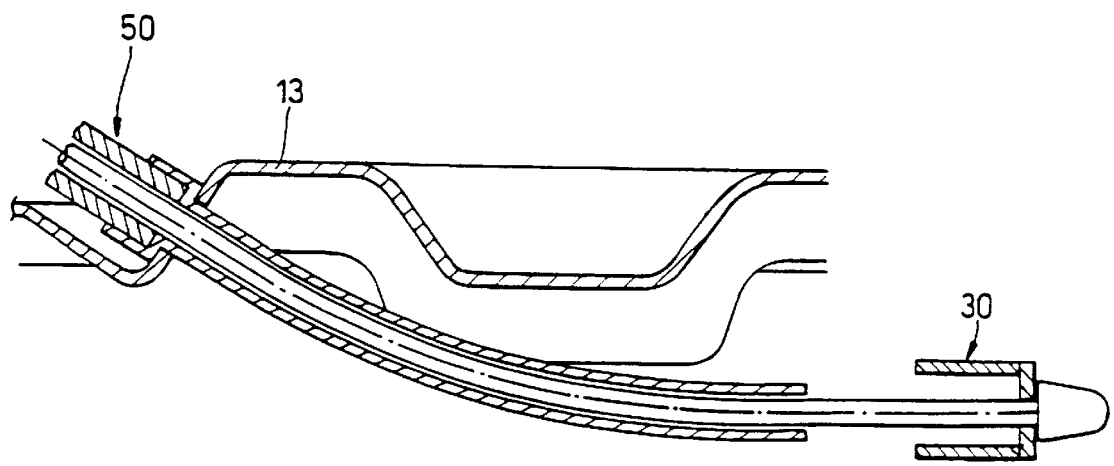

FIGS. 6 and 7 show insertion of the guide into the backplate with the cable inner portion not fully withdrawn. A preferred method of assembly is to fully withdraw the cable inner portion such that abutment 55a contacts abutment 53a and then inserting the guide into the backplate. Under these circumstances the end fitting 55 is less likely to foul components in the parking brake assembly.

The guide of the brake cable can take several forms preferably it is in the form of a tube as shown in FIG. 5 though this need not be the case. Also the guide need not be fully rigid. The guide could flex during insertion into the brake drum assembly and this would assist in avoidance of drum brake components. The guide only needs sufficient stiffness/resilience to ensure the open end of the guide is ultimately presented in the correct position to allow the end fitting to automatically latch and could, for example, be formed from a suitable plastics material.

Figure 10:
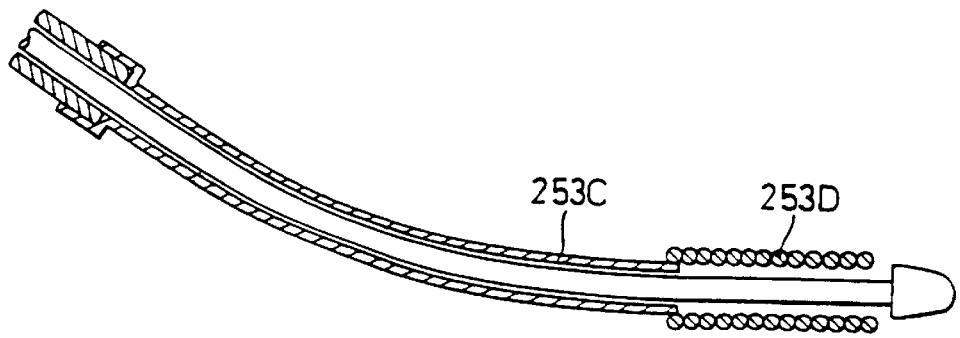
FIGS. 10 and 11 show alternative embodiments of brake cable assemblies with guides.

Thus the guide shown in FIG. 10 comprises a rigid portion 253C and a flexible portion comprising a coil bound spring 253D. The resilience of the spring is sufficient to act as a guide.

Figure 11:
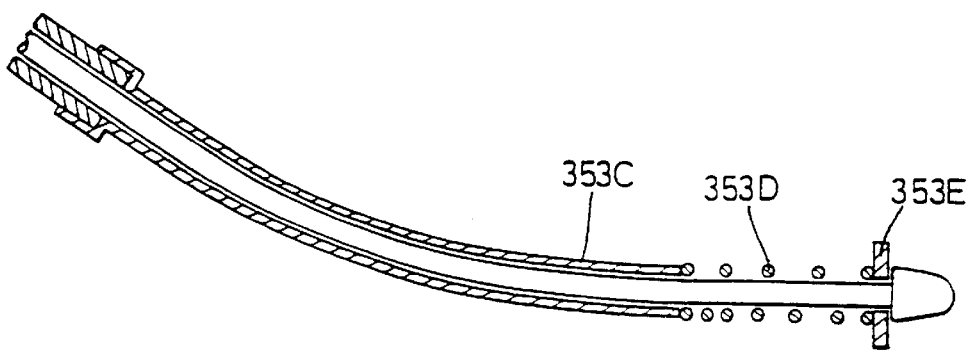

The guide shown in FIG. 11 comprises a rigid portion 353C, a flexibly portion comprising a compression spring 353D, and an abutment 353E in the form of a washer. In this case the spring 353D is laterally rigid enough to act as a guide and when the end portion has been latched onto an automatic latching means e.g. automatic latching means 30 of FIG. 1 the spring 353D reacts via the washer against the lever 15 to form a return spring for the lever. In this case it may be preferable during a method of assembly to include the step of withdrawing the cable inner portion from the cable outer portion until the end fitting compresses the coil spring to a coil bound or near coil bound condition.

What is claimed is:

1. A method of attaching a preassembled brake cable assembly onto a drum brake assembly, the brake cable assembly comprising a cable inner portion with an end fitting and a cable outer portion comprising a cable sheath and a guide attached to a forward end of the sheath, the drum brake assembly comprising at least a back plate and a parking brake lever for operation of a brake shoe to provide a parking function, the lever having an automatic latching device, the method comprising the steps of:
    a) inserting the guide with the cable inner portion therein through a hole in the backplate;
    b) positioning the brake cable assembly such that an open end of the guide is presented adjacent the automatic latching device;
    c) advancing the cable inner portion through the cable outer portion such that the end fitting is guided towards, and engages the automatic latching device.

2. A method of assembling a brake cable onto a drum brake assembly as defined in claim 1 in which the method includes the further step of aligning an orientation feature on the cable outer portion with a corresponding orientation feature on the drum brake assembly to ensure the correct presentation of the open end of the guide adjacent the automatic latching device.

3. A method of assembling a brake cable assembly onto a drum brake assembly as defined in claim 1 which includes the further step of engaging an orientation feature on the cable outer portion with a corresponding orientation feature on the drum brake assembly so that rotation of the guide relative to the drum brake assembly can not occur thus ensuring that the correct presentation of the open end of the guide is maintained.

4. A method of assembling a brake cable assembly onto a drum brake assembly as defined in claim 1 in which the end fitting is incapable of passing along all of the guide and during assembly the cable inner portion is withdrawn from the cable outer portion until the end fitting abuts the guide.

5. A brake cable assembly for attachment to a drum brake assembly the method claimed in claim 1, the brake cable assembly comprising the cable inner portion with an end fitting for connection with the drum brake parking lever the cable inner portion contained within the cable outer portion comprising the cable sheath and the guide attached to a forward end of the cable sheath, the guide being capable of deflecting the cable inner portion from a straight position.

6. A brake cable assembly as defined in claim 5 in which the cable outer portion has an orientation feature to ensure correct alignment of the guide during subsequent fitting of the brake cable onto the drum brake assembly.

7. A brake cable assembly as defined in claim 6 in which the orientation feature on the cable outer portion is shaped to engage a correspondingly shaped orientation feature on a drum brake assembly during subsequent fitting of the brake cable onto the drum brake assembly.

8. A brake cable assembly as defined in claim 5 in which the guide includes a spring.

9. A brake cable assembly as defined in claim 8 in which the spring also acts as a return spring for the drum brake parking lever of the guide is maintained.

10. A drum brake backplate including a brake cable assembly hole and an adjacent orientation feature to ensure correct alignment of the brake cable as defined in claim 5 during fitting of the brake cable assembly.

11. A drum brake assembly including a drum backplate as defined in claim 10.

12. A drum brake backplate including a brake cable assembly hole and an adjacent shaped orientation feature which is capable of engagement with a corresponding shaped orientation feature of the brake cable assembly as defined in claim 5 during fitting of the brake cable assembly.

13. A drum brake assembly including a brake cable assembly as defined in claim 5.

14. A drum brake assembly including the parking brake lever with the automatic latching device and the brake assembly including the backplate having the brake cable hole therethrough and an adjacent shaped orientation feature which engages with a corresponding shaped orientation feature of the preassembled brake cable assembly assembled with the drum brake assembly by the method claimed in claim 1, the brake cable assembly, having the cable inner portion with an end fitting for connection with the brake parking lever and the cable outer portion comprising the cable sheath and the guide attached to a forward end of the sheath, the guide containing the cable inner portion therein and being capable of deflecting the cable inner portion from a straight position to ensure correct alignment of the guide during fitting of the brake cable assembly on the drum brake assembly to position the end fitting of the cable inner portion to engage the automatic latching device on the drum brake.

* * * * *